Figure 1:
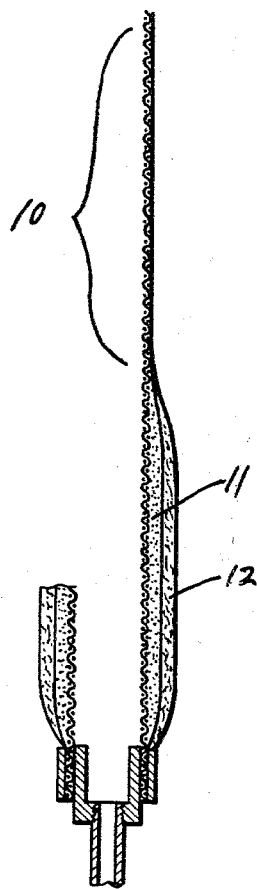

April 13, 1965   U. B. BRAY   3,178,021
FILTRATION
Filed Jan. 15, 1962

INVENTOR.
ULRIC B. BRAY
BY Vandeveer VoorHees
Atty.

United States Patent Office 3,178,021
Patented Apr. 13, 1965

3,178,021
FILTRATION
Ulric B. Bray, Pasadena, Calif., assignor to Bray Oil Company, Los Angeles, Calif., a limited partnership of California
Filed Jan. 15, 1962, Ser. No. 166,242
5 Claims. (Cl. 210—67)

This invention relates to a process of filtration, and particularly to the filtration of oils such as mineral oils, petroleum lubricating oils, vegetable and animal oils, fish oils and the like. More particularly, the invention relatees to the clarification by filtration of cloudy oils containing extremely finely divided solid particles in the range of about 0.1 to 50 microns which do not settle from the oil and which can only be filtered from the oil with the greatest of difficulty owing to their action in sealing off the filter medium.

In general, the suspended solids in a liquid to be clarified are small and highly compressible. A filter septum, such as cloth or paper, with openings fine enough to hold back the suspended solids quickly becomes plugged or slimed over with the accumulation of solids removed and filtrate flow stops. Before a new cycle can begin, the septum must be cleaned—a most difficult job if its pores have become clogged with a collection of slimy solids.

In order to facilitate the filtration of such oils, it has long been the practice to mix with the oil a filter aid which is a relatively coarser material having the function of adsorbing fine particles from the oil, trapping them on the surface of the filter aid and maintaining porosity in the filter cake. One of the best known filter aids for use in the filtration of oils is diatomite. Diatomite (diatomaceous earth, diatomaceous silica, kieselguhr, etc.) is by a great margin the most important filter aid. Processed from deposits of fossilized diatoms, it more nearly meets the criteria for the ideal filter aid than does any other. Many of its tiny particles are porous. All are highly irregular in shape and form a rigid, incompressible cake over the normal range of operating pressures. Since diatomite is primarily silica, it is relatively inert and insoluble. It can be processed and classified to provide an extremely wide range of grades.

In every filtration operation, it is necessary to employ a cloth or screen or other porous medium which will allow the oil to pass through, but will retain the solid particles as a cake. Woven wire cloth of about 30 to 200 mesh is commonly used. Even when filter aids are used, it is found that the filter medium soon becomes clogged or plugged with the fines from the oil and these can only be removed with great difficulty. Sometimes the filter medium can be restored to service by removing it from the filter and cleaning it by mechanical action, brushing, etc., or by the action of chemical reagents which will dissolve out the solid particles plugging the interstices of the filter medium. This operation is obviously time consuming and expensive and it is an object of this invention to eliminate the cleaning of filter cloths, screens, etc., and thereby increase the useful life of the filter, as well as saving down-time. It is also an object of this invention to increase the rate of flow of oil measured in gallons per square foot per hour in commercial oil filtering operations. Still another object of the invention is to maintain a more uniform flow over the entire surface of the filter element.

Figure 2:
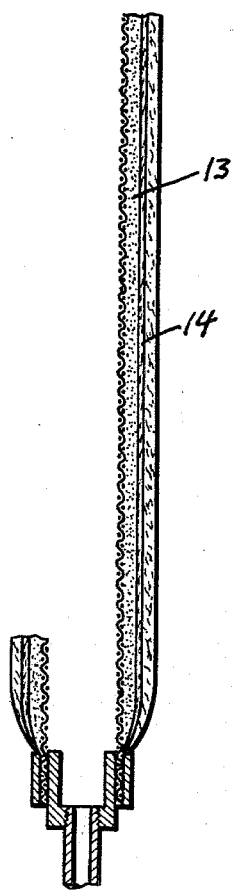

The invention is illustrated by drawings which show in FIGURE 1, a diagrammatic representation of a cross section of a filter leaf typical of the condition encountered after the filtration of a cloudy mineral oil. FIGURE 2 is a cross section of the same leaf after the filtration of the same cloudy mineral oil when employing applicant's improved precoating treatment.

In order to protect the filter medium as far as possible from the plugging action of fine solids in the oil, it has heretofore been the practice to precoat the filter with a variety of materials such as diatomite, cellulose fibers, powdered charcoal and asbestos. These materials are suspended in an oil, frequently the same oil which is being filtered, taken from a previous filter run. The suspension is pumped through the filter in an effort to get a uniform coating over the surface of the filter leaves. In many cases, this is quite difficult owing to the sedimentation of the precoat material which tends to concentrate in the lower section of the filter and build up a heavier coat in the lower areas; for example, in the ordinary plate-and-frame press or the leaf-type filter, such as the Hercules, in which vertical stationary hollow leaves are arranged in parallel with suitable manifolds for filtrate discharge. The precoating solids, such as diatomite, will usually be found to form a much thicker layer on the lower section of the leaves than at the top.

The typical application of filter aid to a batch filtration involves three steps: precoating, filtration with dirty feed and cleaning.

Precoating—The septum is precoated by suspending the proper grade of filter aid in clear liquid in a precoat tank and recirculating the slurry through the filter and back into the tank. The quantity of precoat usually varies from 3 to 12 lb./100 sq. ft. of filter area, depending on the filter design, type of septum and variety of filter selected. The liquid used for this operation should be well clarified, compatible with the liquid to be filtered, and have very nearly the same pH, viscosity and specific gravity. The most desirable precoating liquid is a portion of the filtrate from the previous cycle. The precoating should preferably be done at the same temperature and flow rate at which the filtration itself will be conducted. Departures from these desired conditions are common due to process considerations, but they may be the cause of cracks, bleed-through, incomplete coverage and the like.

The most common difficulties in precoating result from uneven flow over the filtering surface. This causes uneven cake buildup. In an ideal situation, resistance to flow would be the same over the whole area of the filter septum, which would result in equal flow through each part of the available area and thus produce even cake buildup. This ideal is never attained in a plant-scale filter.

Serious problems arise in filters having wide variations in initial resistance over the filter area. For example, if a bottom-outlet filter is not full before flow starts, the cake forms only on the lower portions of the septum that are submerged. Proper venting is mandatory. Automatic vents, or a continuous bleed through a manual vent, can overcome operator forgetfulness. On a bottom-outlet filter, a gooseneck, rising well above the maximum liquid level in the filter, will prevent flow until the filter is full. Plate-and-frame filters are rarely provided with vents on each frame, and must be "force vented" by restricting the outlet until the filter is full. This problem is most troublesome in bottom- or side-outlet plate-and-frame filters.

Wide variations in the flow pattern can also result from dirty or plugged septums, or from clogged internal passages in the filter, downstream of the filter septum. These problems are progressive; once a septum starts to get dirty, or the filtrate "get-away" starts to clog up, the problem gets worse with each succeeding cycle.

A non-uniform precoat may also be caused by an incorrect flow rate during precoating. Too low a flow rate will result in gravity segregation of the filter aid particles; in the extreme case, the filter aid will end up on the bottom of the filter tank. More commonly, the precoat is classified with the fine particles at the top of the septum and the coarse particles at the bottom, causing preferential flow through the bottom.

Too high a flow rate can result in preferential buildup near the outlet, particularly in bottom-inlet, top-outlet filters. It also usually causes scouring of the filter septum near the inlet. Precoating at the same flow rate as the design rate of the filter is recommended.

Once the precoat has been applied, filtration can begin. Continuous feed of filter aid, completely mixed into the liquid, is usually required. This is generally done in one of two ways. The first and simplest is to dump the proper quantity into an agitated tank of the liquid to be filtered. This is most common when the process oil is batch-produced. In such cases, the entire filter station is usually designed to handle one production batch.

If the liquid to be filtered is produced continuously, usually only a small hold-up tank is provided ahead of the filter station to handle surges. A slurry of diatomite is made up in an agitated tank, and injected continuously into the line to the filter by means of a metering pump. A dry feeder may also be used to feed into an agitated hold-up tank at a controlled rate.

In the filtration of cloudy oils containing extremely fine particles of the order of one micron, some of the fine particles pass into the filter medium, cloth or screen, and reduce the flow through certain areas where precoat protection has been reduced. This condition becomes rapidly aggravated on succeeding cycles inasmuch as areas of reduced flow receive less precoat on each succeeding cycle, thereby allowing more and more of the fines to enter the filter medium. We soon develop a condition, illustrated in FIGURE 1, in which a portion of the filter area, indicated at 10, is completely plugged and ineffective, whereas the remainder of the filter may be functioning properly as indicated by the precoat deposit 11 and the superimposed filter cake 12.

I have now discovered that the problem of filtering oils, and particularly mineral lubricating oils, is largely solved by employing a double precoat in which the initial layer is composed of wood flour. For my purpose, I prefer to use wood flour which is ground, for example, in a hammer mill, to pass a 70 mesh screen, although I may use finer grades such as 100 mesh. A typical wood flour made from soft wood, such as poplar or pine, may consist of particles of wood of very irregular shapes, having a dimension in the long axis of the order of 10 to 500 microns, mostly 25 to 200 microns. The absolute density, as determined by suspending in a liquid, is 1.44 in the case of soft wood particles. This low density, compared with minerals such as diatomite, asbestos and carbon, facilitates the suspension and distribution of the wood flour over the surface of the filter screen. A typical application of wood flour is about 0.125 lb. per square foot. Generally, an amount within the range of 0.05 to 0.25 lb. per square foot is sufficient. I have discovered that, owing to the irregular shape of the wood flour particles and their low absolute density, I can obtain a uniform layer over the entire surface of the filter medium, as shown in FIGURE 2 at 13.

Inasmuch as the coating of wood flour is very weak and easily fractured, it is necessary to give it additional strength or support by then applying a conventional fibrous filter precoating material such as chrysolite. This material is a mixture of cotton fibers and asbestos in approximately equal amounts. It forms a uniform layer over the wood flour, as shown in FIGURE 2 at 14. Like the wood flour precoat, it is carried into place by dispersing it in oil and forcing a stream of the oil through the layer of wood flour on the filter. A suitable amount of the chrysolite reinforcing agent is about 0.025 pound per square foot, although this may vary from about 0.01 to 0.1 lb. per square foot of filter area. It is carried into the wood flour layer by the oil stream and serves the purpose of strengthening the layer of wood flour owing to the long fibers of cotton and asbestos, the ratio of fiber length to diameter usually being in the range of about 20 to 200 or more. The extremely fine character of the asbestos fibers also aids in rendering the wood flour precoat layer more impervious to penetration by the particles of fine solids carried in the oil which is forced into the filter at the next stage. When using wire cloth filters, which are very free flowing, the wood flour serves to build up a resistance to flow sufficient to produce an even distribution of chrysolite.

Following the precoating as just described, the oil is next forced through the press without interruption. The rate of flow during precoating is suitably about one-half gallon per minute per square foot of filter area. With this flow rate, the pressure may build up to about 25 p.s.i. during application of the wood flour. Then when the second layer of reinforcing precoat is applied, the pressure will typically reach about 30 p.s.i. at this rate of flow.

Most cloudy oils can be clarified by the use of coarser types of filter aids; for example, diatomite which has been processed to give high rates of flow. Two well known commercial filter aids of this type are Hy-Flow and Dicalite. Finer grades of diatomite known as standard grade Supercel and Filtercel are useful either alone or in admixture with coarser grades where the oil contains extremely fine particles difficult to remove with Hy-Flow. The amount of filter aid depends upon the amount of solids contained in the oil and will usually vary from about 1 to 5%. The pressure during filtration will usually be relatively low at the start and increase gradually toward the end of the filtration cycle; for example, from 25 p.s.i. to 100 p.s.i. At the end of the filtration cycle, excess oil is withdrawn from the filter where possible, as in the case of a vertical leaf filter of the Hercules type, and the cake is dried by air pressure. Where the filtration is conducted at a temperature above about 225° F., the cake may be dried by the use of steam. The press is then opened and the cake is discharged, usually by merely shaking the filter leaves or, in the case of plate-and-frame filter presses, by shaking the cloths. The wood flour precoat layer greatly facilitates the cleaning of the press because of its friable nature and low adherence to the filter membranes. I have found that, where my wood flour precoating is applied to a filter which is partially plugged in certain areas, the wood flour even serves to remove part of the deposits in the filter screens.

As an example of the improvement obtained by the use of my invention, a Hercules filter equipped with twilled wire screens of 24 x 52 wires per square inch with a total screen area of 600 square feet was precoated with 60 pounds of chrysolite in the conventional manner. A cloudy lubricating oil containing finely dispersed lime was forced through the press with a yield of only 400 gallons per cycle when flow substantially stopped. Operating in this manner, it was frequently necessary to remove and replace filter plates because of plugging. After the wood flour precoat method was applied to this press, it was found possible to operate with yields of 3,000 to 4,000 gallons per cycle and no further cleaning was required.

Although I have described my invention with respect to specific examples, I do not intend these to be limiting except as set forth in the following claims.

I claim:

1. The method of filtering a cloudy oil containing in suspension, fine solid particles in the range of 0.1 to 50 microns diameter which tend to enter the pores of the filter medium and render it impervious to the flow of oil, the improvement comprising the following steps:

(a) Initially applying to the filter medium a precoat of wood flour by forcing through said medium an oil suspension of said wood flour;

(b) Reinforcing the wood flour precoat layer by forcing through it an oil suspension of a fibrous material;

(c) Suspending in said cloudy oil a suitable filter aid;

(d) Forcing said cloudy oil and suspended filter aid through said precoated filter medium where the fine solid particles are retained on said precoat as a cake, eventually reducing the rate of flow to an uneconomical level;

(e) Discontinuing the flow of cloudy oil and drying the filter cake by blowing with a gas;

(f) Then dislodging the cake and loosely adherent wood flour precoat from said filter medium.

2. The method of claim 1 wherein said wood flour is ground to pass a 70 mesh screen.

3. The method of claim 1 wherein the said filter medium is a wire screen of about 30 to 200 mesh.

4. The method of claim 1 wherein the said wood flour precoat is about 0.05 to 0.25 pound per square foot of filter area.

5. The method of claim 1 wherein said fibrous reinforcing material (b) is a mixture of asbestos and cotton.

References Cited by the Examiner
UNITED STATES PATENTS

| | | | |
|---|---|---|---|
| 1,723,741 | 8/29 | Manning | 210—75 |
| 2,041,763 | 5/36 | Heckman | 210—75 |
| 2,055,869 | 9/36 | Manning | 210—75 |
| 2,596,392 | 5/52 | Fessler | 210—75 X |

REUBEN FRIEDMAN, *Primary Examiner.*

HERBERT L. MARTIN, *Examiner.*